April 25, 1967 R. T. KEATING 3,315,654
HIGH VELOCITY OVEN
Filed March 15, 1965
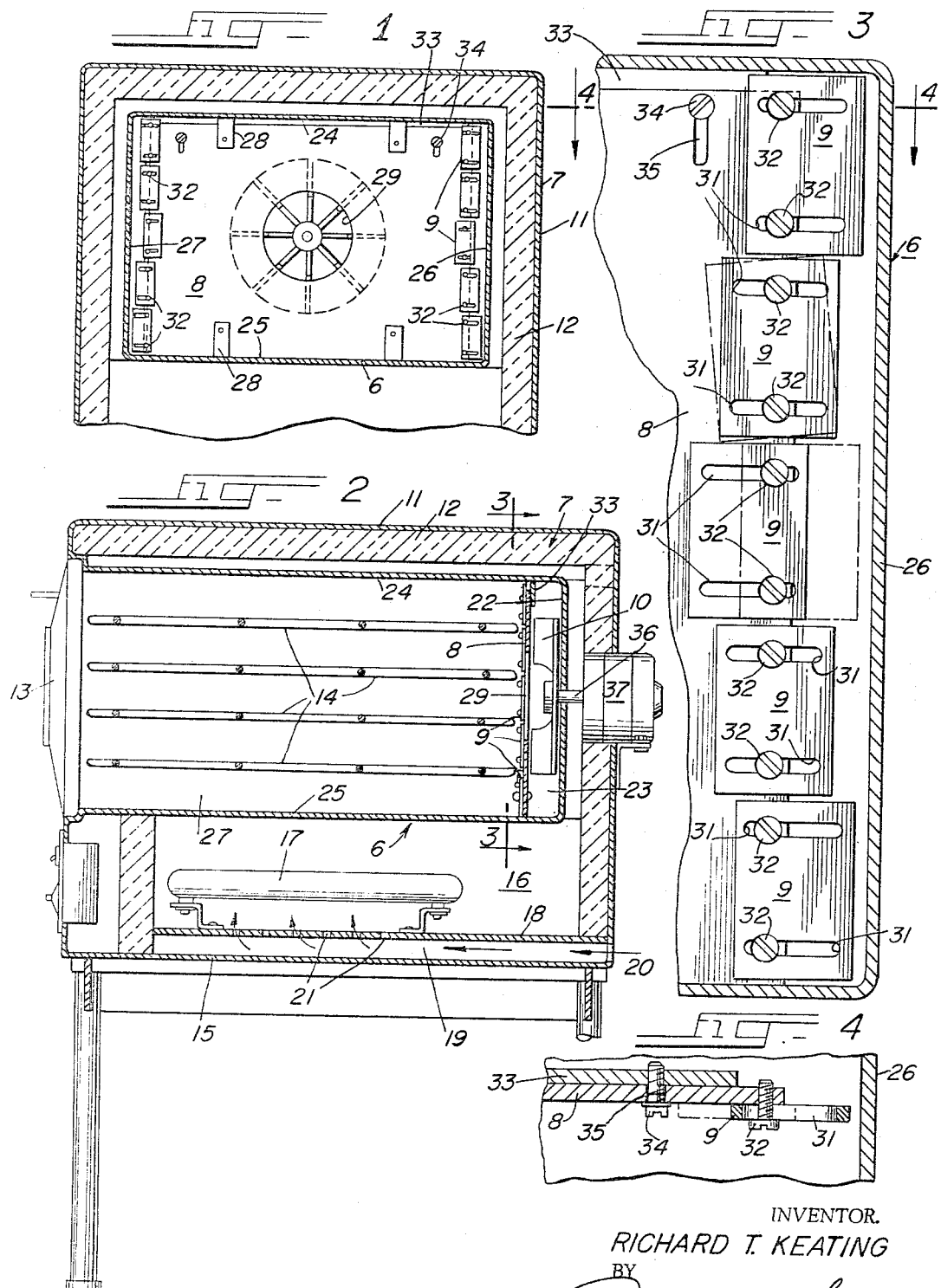
INVENTOR.
RICHARD T. KEATING
BY
Pummler & Snow
ATTYS.

United States Patent Office 3,315,654
Patented Apr. 25, 1967

3,315,654
HIGH VELOCITY OVEN
Richard T. Keating, 1210 W. Van Buren St.,
Chicago, Ill. 60607
Filed Mar. 15, 1965, Ser. No. 439,851
9 Claims. (Cl. 126—21)

This invention relates to baking ovens of the type generally designated as "high velocity" thermal convection ovens for use in commercial baking of dough products.

In the commercial production of such dough products as pies, cakes, biscuits, rolls and the like, these ovens are also known as muffled oven in that they are in the form of a closed externally heated sheet-metal cabinet enclosed within a circumferentially spaced insulated housing, the cabinet or oven chamber often measuring approximately 18" by 27" and 30" deep. Usually, several vertically spaced racks are arranged in such an oven and the air within the oven is usually circulated by a positive type impeller fan.

The problem has always been to achieve a uniform cooking temperature throughout the oven space and a uniform rate of cooking and browning of pies, cakes, biscuits, rolls and the like, and on the several rack levels at the same time over the entire area of each rack.

The main objects of this invention are: to provide an improved internal structuring of a muffled oven comprising a high-velocity oven especially adapted for the baking of dough products on a series of vertically spaced racks; to provide an improved internal structuring of an oven of this kind with an inner-end-baffle defining internal lateral areas for the inflow of recirculated air and mounting perimetrical means for regulating the dimension of these lateral areas to ensure optimum air distribution for the most effective baking results; and to provide an improved baffle arrangement of this kind which is of such simple structure as to make its manufacture very economical and its use facile and gratifying.

In the adaptation shown in the accompanying drawing:

FIGURE 1 is a transverse, sectional elevation of an improved baking oven constructed in accordance with this invention;

FIG. 2 is a longitudinal, sectional view of the same;

FIG. 3 is an enlarged view showing a fragmentary lateral portion of the baffle mounting adjustable plates constructed in accordance with this invention, the view being taken on the plane of the line 3—3 of FIG. 2; and FIG. 4 is a fragmentary, sectional detail taken on the plane of the line 4—4 of FIG. 3.

The essential concept of this invention involves a closed sheet-metal chamber forming a high-velocity convection type cooking oven having an interiorly disposed motor-driven centrifugal-type fan located between the inner end wall and a baffle, the lateral edges of which are spaced from the side walls of the chamber to provide passage for air driven by the fan into the oven space outward from the baffle and upon which baffle adjustable plates are arranged along the said edges to permit varying the area of air-flow outlet vertically along the lateral edges of the baffle with a view to obtaining the best air distribution to produce uniform cooking throughout a multiple stack of dough products.

A high-velocity type oven embodying the foregoing concept comprises a closed sheet-metal oven chamber or cabinet 6 enclosed within a heated, insulated housing 7 at one end of which cabinet 6 is arranged a baffle 8 with the opposite lateral edges predeterminedly spaced from the opposed side walls of the cabinet 6 and whereon are mounted a plurality of plates 9 relatively adjustable on the baffle 8 to permit altering the area between the lateral edges of the baffle and the opposed cabinet walls to vary the air inflow from a motor-driven fan 10 positioned intermediate the baffle 8 and the rear wall of the cabinet 6.

The oven chamber or cabinet 6, as herein shown, is made of sheet-metal and is of rectangular form integrated with a sheet-metal housing structure 11 wherein is arranged an insulating lining 12 to constitute the cabinet housing 7 and, in the construction shown, the juncture of the front end of the cabinet 6 and the housing structure 11 is offset to form a seat for a door 13 closing the entrance to the cabinet 6. In a typical embodiment of this invention, the cabinet 6 is dimensioned approximately 27 inches in width, 18 inches in height and about 30 inches in depth between the baffle 8 and the door 13. Within the cabinet is arranged a stack of vertically spaced wire shelves or racks 14, herein shown as four in number. These racks 14 extend the full depth of the cooking compartment and are uniformly spaced apart vertically from each other and the top and bottom walls of the cabinet 6.

The housing 7 has the bottom 15 thereof spaced well below the bottom of the cabinet 6 to provide a compartment 16 for a heater 17. As here shown this heater 17 is a gas burner set on a partition 18 above the housing bottom sufficiently to provide for an air duct 19 leading from an air inlet port 20 to a series of apertures 21 in the partition 18. As shown in FIGS. 1 and 2 the insulated side walls and top wall of the housing are spaced from the side and top walls of the cabinet 6 to provide continuous passage for the heated air and products of combustion from the burner compartment 16 over the side and top walls of the cabinet to heat the same for convection transfer to the air within the cabinet being circulated by the fan 10.

The baffle 8, a generally planar piece of metal, is secured adjacent the rear wall 22 of the cabinet 6 to provide a compartment 23 for the fan 10 (FIG. 2). As shown, the baffle 8 is dimensioned to dispose its lower edge in direct contact with the bottom wall of the cabinet 6 but with the upper edge and lateral edges of the baffle spaced from the respective opposed top wall 24 and side walls 26 and 27 of the cabinet 6. In the form shown, the baffle 8 is secured in such position by brackets 28 with the lateral edges of the baffle spaced approximately 1¾₀ inches from the opposed side walls 26 and 27 of the cabinet 6 and the top edge of the baffle spaced about ¾ inch from the top wall 24. The baffle 8, as shown, is also formed with a central circular opening 29, of predetermined diameter relative to the hereinafter-described centrifugal fan 10, through which oven air returns to the fan 10 for recirculation over the edges of the baffle and along the oven walls.

The lateral plates 9, herein shown in the number of five and rectangular in contour, are arranged in a vertical series along each of the opposite lateral edges of the baffle 8. Each such plate 9 has a pair of transverse slots 31 formed therein through which extend kerf-headed, threaded fasteners 32. These plates 9, as shown, are approximately 2" by 3½" in dimension and are arranged vertically adjacent the lateral baffle edges. The slots 31 are so formed in the plates 9 and the fasteners 32 are so threaded into the baffle 8 as to permit the plates 9 to be individually shifted between positions that bring the outer edges of the plates flush with the respective lateral edges of the baffle 8 or into contact with the respective side walls 26 and 27 of the cabinet 6. The spacing between the plates 9 and the form of the slots is such as to permit a slight angling of any one of the plates 9, with respect to the vertical, as shown in broken outline in FIG. 3. There being five of these plates 9 along each lateral edge of the baffle, in the arrangement shown, disposes the plates respectively between the top wall 24 of the cabinet 6 and the uppermost rack 14 and the bottom wall 25 of the cabinet 6 and the lowermost rack 14. The three intermediate plates 9 are disposed opposite the spaces between the four racks 14. This permits air flow adjustment at each shelf or rack level where air can pass inwardly toward the oven chamber.

The space between the top edge of the baffle 8 and the upper wall 24 of the oven chamber is normally closed by means of a vertically adjustable blade or plate member 33 which extends substantially the length of the said top edge, on the back side thereof. In the construction shown, the blade or plate 33 is mounted on the baffle 8 by means of a pair of suitable machine screws 34 which pass through vertically elongate openings 35 in the baffle and are threaded into the blade 33, as shown in FIG. 4. Thus, when the screws 34 are loosened, the blade 33 can be lowered away from the top oven wall 24, to permit a flow of air over the top of the baffle 8, the slots or elongate openings 35 in the baffle plate 8 permitting vertical adjustment of the blade 33 to control the size or width of the space between the top baffle edge and the opposed oven wall and thus the volume of air that would be discharged into the oven chamber over the top edge of the baffle. Under some circumstances air flow into the oven at the top edge of the baffle is desirable and with this arrangement the need can readily be accommodated. It will be understood, however, that ordinarily the blade 33 will function as an extension of the baffle itself to close contact with the top wall of the oven chamber.

The fan 10, as here shown, is of the conventional centrifugal impeller type keyed to the end of a shaft 36 for a motor 37 appropriately mounted on the rear wall of the insulated housing 7.

In an oven of the herein-indicated dimensions, for use in baking dough products, the trays on the upper and lower racks 14 are most directly exposed to and effected by the heat radiated from the upper and lower walls 24 and 25 of the cabinet 6. Obviously, the products on these trays will more readily achieve acceptable internal cooking and exterior browning than the dough products on the intermediate racks 14. Therefore, in ovens of this type, variously-formed and positioned fixed baffles have been located with the perimeters thereof variously-spaced from the opposed walls of the oven in an endeavor to overcome this deficiency. The aim has been to proportion the areas of these perimetrical spaces along the baffle edges to a central opening in the baffle so that the fan, operating at a predetermined high speed, to drive air forwardly over the edges of the baffle, would create such a turbulent circulation of heated air within the oven as to effect a uniform temperature throughout the oven chamber whereby the products on all of the vertical stack of racks and over the entire areas thereof would cook at the same rate. In antecedent oven structures such a desired result has not always been achieved.

The herein-shown arrangement of the baffle 8 mounting the supplemental lateral rows of individually-adjustable plates 9 and the upper edge blade 33 has been found to more nearly achieve this desired uniform cooking of products on all levels, from front to rear and in the middle of the oven chamber. This has been made possible in particular by providing for individual adjustment of each of these plates 9 on the baffle 8 so as to permit varying the air-flow areas along the side walls 26 and 27 of the cabinet 6 from top to bottom thereof, according to the particular requisites of each oven as dictated by working experience with that oven. Also, when needed, the blade 33 can be adjusted to open air flow at the top wall of the oven to increase heat supplied to the upper shelf or rack. Each oven, for some reason or other, has its own peculiarities of air circulation. Thus with the present invention, each oven can be adjusted as may be desired. The extent to which these air inflow areas may be relatively altered is indicated clearly in FIGURE 3.

Although but one specific embodiment of this invention has been herein shown and described, it will be understood that details of the construction shown may be altered or omitted without departing from the spirit of the invention as defined by the following claims.

I claim:

1. A muffled oven comprising, a sheet-metal cabinet positioned within a heated insulated housing, a transverse baffle having a central opening positioned in the cabinet adjacent one wall thereof to form a fan compartment with the lateral edges of the baffle being predeterminedly spaced from the opposed walls of the cabinet, a fan impeller disposed in the fan compartment, means for driving said impeller, and a plurality of juxtaposed elements adjustably mounted on the baffle along the lateral edges thereof for varying the area between the lateral edges of the baffle and the opposed cabinet walls for regulating the air-flow from the fan compartment into and through the oven inwardly of the baffle.

2. A muffled oven as set forth in claim 1 wherein one of the edges of the baffle intermediate the said lateral edges is in closed contact with the respective opposed wall of the cabinet.

3. A muffled oven as defined by claim 1 wherein one of the edges of the baffle intermediate the said lateral edges is spaced from the respective opposed wall of the cabinet and the baffle has a blade adjustably mounted on the margin of said one edge and extending therealong for closing engagement with said respective opposed wall.

4. A muffled oven as set forth in claim 1 wherein the said elements are in the form of plates each slotted and secured to the baffle by a releasable fastener to permit selective adjustments of the plates with respect to each other and to the lateral edges of the baffle.

5. A high-velocity type oven as set forth in claim 1 wherein the elements are in the form of plates each slotted and secured to the baffle by a fastener to permit selective adjustment of the plates relative to each other and to the lateral edges of the baffle, the form of the slots and the disposition of the fasteners being such as will permit anyone of the plates to be secured in a position slightly angled to the vertical.

6. A high velocity oven comprising,
   (a) a housing of rectangular form with insulated walls,
   (b) a sheet-metal cabinet fixed in the housing in spaced relationship to the insulated top, bottom and side walls of the housing and having an open-end closure,
   (c) means for heating the walls of said cabinet,
   (d) a baffle of rectangular contour positioned inwardly adjacent a wall of the cabinet to form a fan compartment therebetween, said baffle having its lateral edges predeterminedly spaced from the opposed side walls of the cabinet and also having a central opening communicating with the fan compartment,
   (e) a centrifugal fan impeller positioned in the said compartment and means for driving said impeller,
   (f) a plurality of racks positioned in the cabinet in vertically-spaced relationship, and
   (g) a plurality of vertically aligned plates, each having at least one slot formed therein, shiftably attached to the baffle along each lateral edge thereof by fasteners extending through the plate slots, said plates being variously adjustable relative to each other and the opposed cabinet side walls to alter the area of the space between the said lateral baffle edges and the respective opposed walls to control the air-flow from the fan impeller into and through the oven inwardly of the baffle.

7. A high-velocity oven as set forth in claim 6 wherein the lower edge of the baffle is in closed relation with the opposed lower wall of the cabinet.

8. A high-velocity type oven as set forth in claim 6 wherein the number of plates along each lateral edge of the baffle is equal to the number of spaces between the respective racks and the top and bottom of the oven.

9. A high-velocity type oven as set forth in claim 6 wherein the number of plates along each lateral edge of the baffle is equal to the number of spaces between the respective racks and the top and bottom walls of the cabinet and any one of which plates may be secured in a position slightly angled to the vertical.

References Cited by the Examiner

UNITED STATES PATENTS 2,957,064 10/1960 Scofield _____ 126—21
3,074,393 1/1963 Keating _____ 126—21

FREDERICK L. MATTESON, JR., *Primary Examiner.*
EDWARD G. FAVORS, *Examiner.*